US008001277B2

(12) United States Patent
Mega et al.

(10) Patent No.: US 8,001,277 B2
(45) Date of Patent: Aug. 16, 2011

(54) DETERMINING, TRANSMITTING, AND RECEIVING PERFORMANCE INFORMATION WITH RESPECT TO AN OPERATION PERFORMED LOCALLY AND AT REMOTE NODES

(75) Inventors: Cataldo Mega, Tuebingen (DE); Sundar Veliah, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 11/611,099

(22) Filed: Dec. 14, 2006

(65) Prior Publication Data

US 2007/0104118 A1 May 10, 2007

Related U.S. Application Data

(63) Continuation of application No. 11/270,007, filed on Nov. 9, 2005.

(51) Int. Cl.
*G06F 15/16* (2006.01)

(52) U.S. Cl. ........................................ 709/247; 709/232

(58) Field of Classification Search .................. 709/247, 709/232
See application file for complete search history.

(56) References Cited

U.S. PATENT DOCUMENTS

| | | | |
|---|---|---|---|
| 4,905,233 A * | 2/1990 | Cain et al. ..................... | 370/237 |
| 5,506,844 A | 4/1996 | Rao | |
| 5,864,678 A * | 1/1999 | Riddle .......................... | 709/235 |
| 6,216,157 B1 | 4/2001 | Vishwanath et al. | |
| 6,339,787 B1 | 1/2002 | Yohe et al. | |
| 6,804,401 B2 | 10/2004 | Nelson et al. | |
| 2002/0010771 A1 * | 1/2002 | Mandato ....................... | 709/223 |
| 2004/0156543 A1 * | 8/2004 | Gardella et al. .............. | 382/166 |
| 2006/0013235 A1 * | 1/2006 | Farnham ....................... | 370/401 |

FOREIGN PATENT DOCUMENTS

WO 0124378 A2 4/2001

OTHER PUBLICATIONS

Sucu, S., et al., "ACE: A Resource-Aware Adaptive Compression Environment", Proceedings of the International Conference on Information Technology: Computers and Communications, IEEE, 2003.*
Cheung, A., "Data Transfer Using Controlled Compression" (master's thesis), University of Waterloo, Ontario, Canada, 1996.*
Krintz, C., et al., "Reducing Delay With Dynamic Selection of Compression Formats", Proceedings of the International Symposium on High Performance Distributed Computing (HPDC), 2001.*

(Continued)

*Primary Examiner* — Karen C Tang
*Assistant Examiner* — John Isom
(74) *Attorney, Agent, or Firm* — Konrad Raynes & Victor LLP; David W. Victor

(57) ABSTRACT

Further provided are a method, system, and article of manufacture for determining, transmitting, and receiving performance information with respect to an operation performed locally and at remote nodes. Performance information is determined with respect to performing an operation at a node and transmitted to remote nodes over a network. Performance information is received from the remote nodes with respect to the remote nodes performing the operation. The determined and received performance information is used to determine whether to perform the operation at one of the remote nodes or the node. Other embodiments are disclosed and claimed.

24 Claims, 5 Drawing Sheets

OTHER PUBLICATIONS

Hu, N., "Network Aware Data Transmission with Compression", Carnegie Mellon University, 2001.*

Wolski, "Dynamically forecasting network performance using the Network Weather Service", 1998, Cluster Computing 1, pp. 119-132.*

Wolski, R., N.T. Spring, & J. Hayes, "The Network Weather Service: A Distributed Resource Performance Forecasting Service for Metacomputing", © 1999 Elsevier Science B.V., 12 pp.

Amendment 1, May 29, 2009, for U.S. Appl. No. 11/270,007, Total 19 pp.

Amendment 2, Dec. 3, 2009, for U.S. Appl. No. 11/270,007, Total 20 pp.

Amendment 3, Jul. 19, 2010, for U.S. Appl. No. 11/270,007, Total 17 pp.

Final Office Action 1, Sep. 3, 2009, for U.S. Appl. No. 11/270,007, Total 36 pp.

Notice of Allowance 1, Sep. 20, 2010, for U.S. Appl. No. 11/270,007, Total 19 pp.

Office Action 1, Jan. 29, 2009, for U.S. Appl. No. 11/270,007, Total 36 pp.

Office Action 3, Mar. 17, 2010, for U.S. Appl. No. 11/270,007, Total 44 pp.

Supplemental Amendment 4, Aug. 24, 2010, for U.S. Appl. No. 11/270,007, Total 10 pp.

* cited by examiner

Network Performance Entry

Compression Performance Entry

CR Entry

Data Type Entry

DETERMINING, TRANSMITTING, AND RECEIVING PERFORMANCE INFORMATION WITH RESPECT TO AN OPERATION PERFORMED LOCALLY AND AT REMOTE NODES

CROSS REFERENCE TO RELATED APPLICATIONS

This application is a continuation of U.S. patent application Ser. No. 11/270,007, filed on Nov. 9, 2005, which patent application is incorporated herein in its entirety.

BACKGROUND OF THE INVENTION

1. Field of the Invention

The present invention relates to a method, system, and article of manufacture for determining, transmitting, and receiving performance information with respect to an operation performed locally and at remote nodes.

2. Description of the Related Art

Enterprises collect and archive large amounts of information in content repositories, also known as content management systems. Such content management systems provide for the scalable and efficient delivery of content to users at client workstations. Such systems facilitate the data transfer from shared network file systems, such as web servers, libraries, etc.

Content management systems may compress data being transmitted over a network to reduce the network transmission time and improve the delivery speed. Typically, the content delivery policies comprise a static system configuration that either transmits all data compressed or uncompressed, depending on a centrally administered compression setting. Such static compression settings apply to all client workstations to which data is transmitted regardless of the network conditions and compression computational processing capabilities that exist during runtime. Moreover, different compression technologies may require different amounts of computational resources and have different compression benefits, i.e., compression ratios.

Accordingly, there is a need in the art for improved techniques to determine how to deploy compression technologies when transmitting data over a network.

SUMMARY

Provided are a method, system and program for determining whether to compress data transmitted over a network. A determination is made of compression performance for a compression algorithm to use to compress data to transmit to a target node over a network and of network performance of the network. The determined compression performance and the network performance are used to determine whether to compress the data. The data is compressed in response to determining to compress the data and the compressed data is transmitted to the target node over the network in response to compressing the data. The data is transmitted to the target node uncompressed in response to determining not to compress the data.

In a further embodiment, data is transmitted on the network to the target node to determine the network performance and compression performance is maintained for different compression algorithms and nodes. The determined compression performance is based on the compression performance when using the compression algorithm at the target node and a source node compressing and transmitting the data to the target node.

In a further embodiment, the compression performance for the target node comprises a decompression performance and the determined compression performance comprises an average of the compression performance for the source node and the decompression computational cost.

In a further embodiment, the determined compression performance comprises a minimum of the compression performance for the compression algorithm executed at the target node and the source node.

In a further embodiment, the compression performance for different compression algorithms are calculated by the nodes during node operations to provide node specific compression performance. The source node broadcasts the calculated compression performance for different compression algorithms to additional nodes in the network for the additional nodes to use when determining whether to compress data.

In a further embodiment, using the determined compression performance and the network performance to determine whether to compress the data comprises comparing the compression performance to an equation including the network performance. The compression performance has to exceed a result of the equation including the network performance to indicate to compress the data, wherein a magnitude of the equation increases correlates to the network performance.

In a further embodiment, a determination is made of a compression ratio (CR) resulting when the compression algorithm compresses the data to transmit. The determined CR is used along with the determined compression and network performance to determine whether to compress the data.

In a further embodiment, using the determined compression performance, network performance and CR to determine whether to compress the data comprises comparing the compression performance to an equation including the network performance and CR. The compression performance has to exceed a result of the equation including the network performance and CR to indicate to compress the data.

In a further embodiment, a magnitude of the result of the equation is directly related to a magnitude of the network performance and inversely related to a magnitude of the compression ratio.

In a further embodiment, the equation comprises $2*NTR/(1-CR)$.

In a further embodiment, the source node maintains a first data structure indicating the network performance to different nodes in the network, a second data structure including compression performance at nodes in the network for different compression algorithms; a third data structure maintaining a compression ratio for different compression algorithms, and a fourth data structure indicating compression algorithms to use for different data types. A determination is made of a data type of the data to transmit. The compression algorithm comprises the compression algorithm indicated in the fourth data structure for the determined data type, the network performance comprises the network performance for the target node indicated in the first data structure, the compression performance comprises the compression performance for the target node and the compression algorithm indicated in the second data structure, and the compression ratio comprises the compression ratio indicated in the third data structure for the compression algorithm.

In a further embodiment, the compression performance comprises a compression throughput rate in bytes per second and wherein the network performance comprises a network throughput rate in bytes per second.

DETAILED DESCRIPTION

Figure 1:
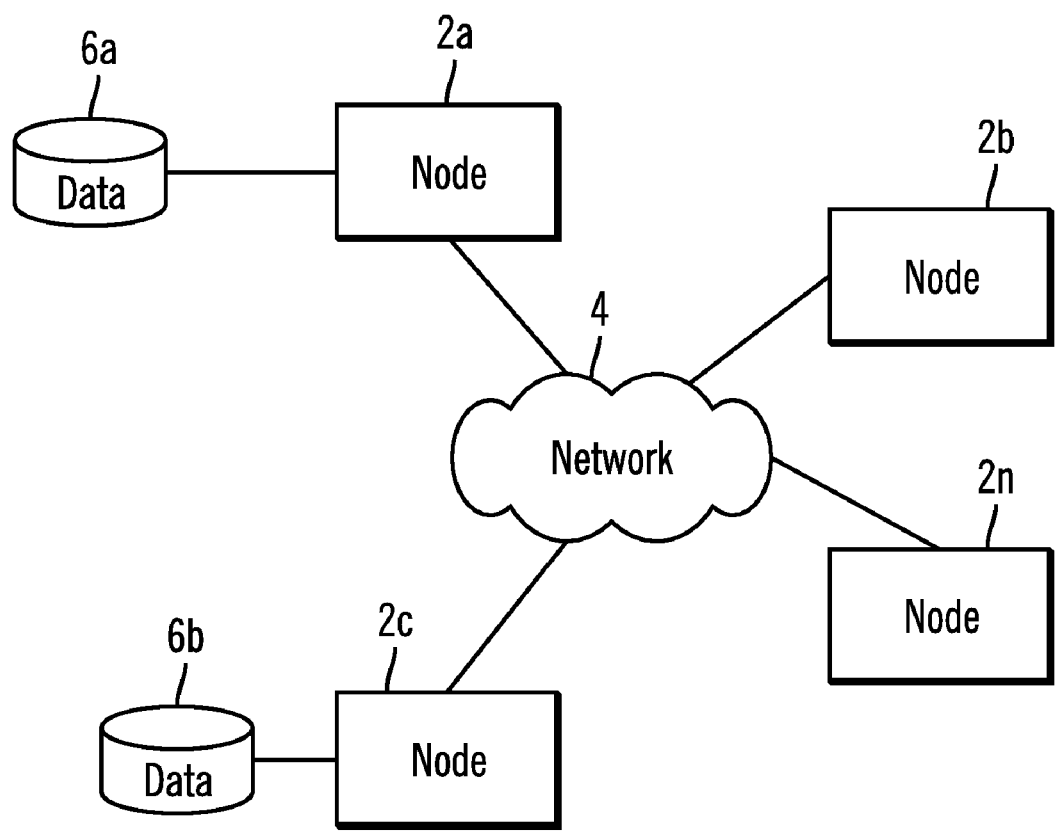
FIG. 1 illustrates an embodiment of a network computing environment.

FIG. 1 illustrates a network computing environment including a plurality of nodes 2a, 2b, 2c . . . 2n that communicate over a network 4. Certain of the nodes, e.g., 2a and 2c, may provide access to files in a storage system 6a, 6b. The nodes 2a, 2c providing access to files may comprise servers, content managers, etc., that receive requests for data from other nodes, such as nodes 2b and 2n. Nodes 2a, 2c providing access to files in storage 6a, 6b may comprise server class machines capable of handling requests for data. Other nodes, e.g., 2b and 2n, may comprise computational devices known in the art, such as servers, mainframes, desktop computers, hand held computers, portable computers, telephony devices, etc. The network 4 may comprise a Local Area Network (LAN), Storage Area Network (SAN), peer-to-peer network, Wide Area Network (WAN), wireless network, etc. Further, there may be more than one network that the nodes may communicate over. The storage systems 6a, 6b may be implemented in storage devices known in the art, such as one hard disk drive, a plurality of interconnected hard disk drives configured as Direct Access Storage Device (DASD), Redundant Array of Independent Disks (RAID), Just a Bunch of Disks (JBOD), etc., a tape device, an optical disk device, a non-volatile electronic memory device (e.g., Flash Disk), a tape library, etc. The files included in the storage systems 6a, 6b requested by nodes may comprise multi-media files, e.g., video, audio, etc., database files, text files, structured documents (e.g., Extended Markup Language (XML) documents), etc.

Figure 2:
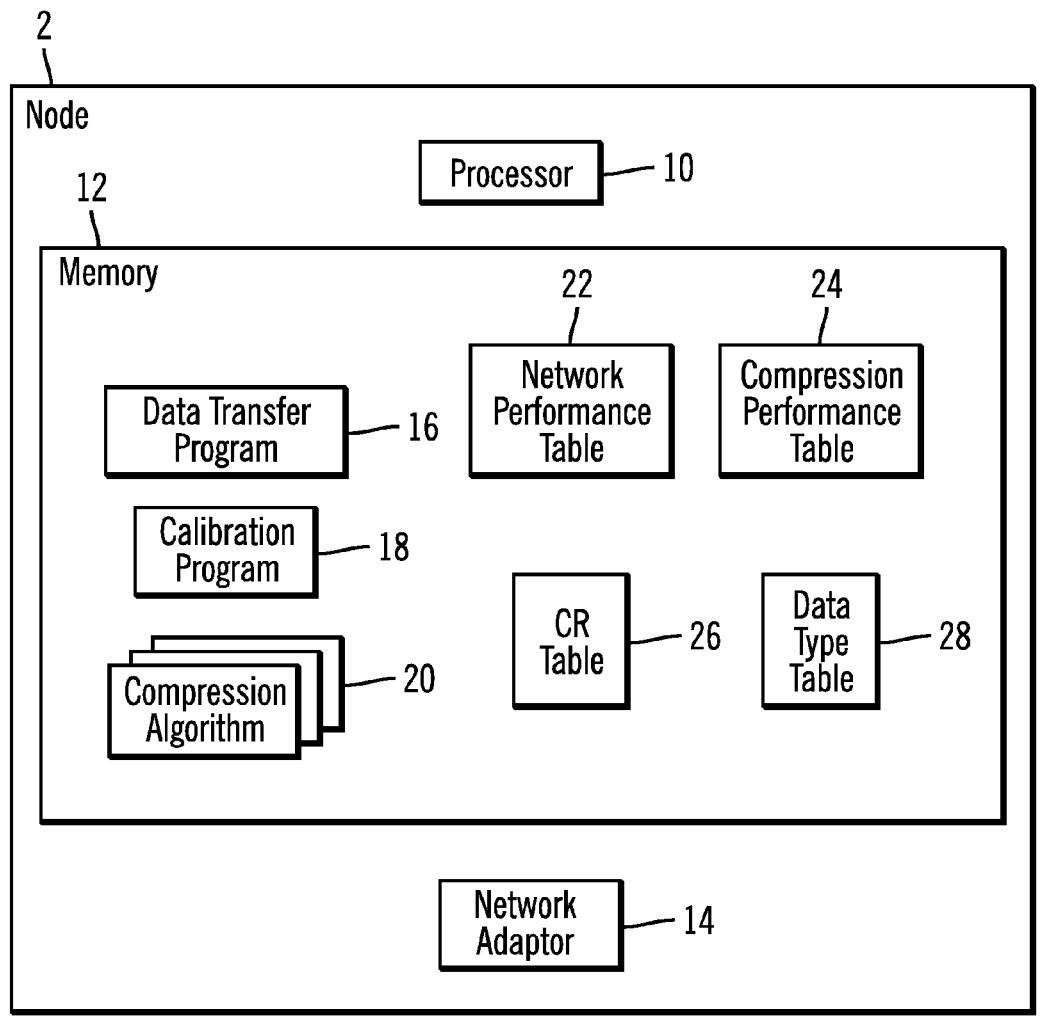
FIG. 2 illustrates an embodiment of components in a node in the network computing environment.

FIG. 2 illustrates components within a node 2 that provides access to data in a storage system 6a, 6b, such as nodes 2a, 2c. The node 2 includes a processor 10, a memory 12, which may comprise one or more physical memory or storage devices, and one or more network adaptors 14 (only one is shown) to enable communication with nodes over the network 4. The memory 12 includes a data transfer program 16 which determines whether to compress data before transmitting data to another node on the network 4. A calibration program 18 is executed to determine the computational performance of a node 2 with respect to executing compression algorithms 20 to compress and decompress test data. The compression algorithms 20 may comprise data compression algorithms known in the art, such as GNU zip (gzip), Tar, LZOP, SZIP, JAR, PPMD, PKZIP, LHARK, etc. Once the calibration program 18 determines the node's computational performance with respect to the different available compression algorithms 20, i.e., the compression performance, the calibration program 18 may broadcast the compression performance information to other nodes in the network 4.

In determining whether to compress data to transfer to another node, the data transfer program 16 may utilize the following tables in the memory 12, including a network performance table 22 providing information on the network performance (e.g., a network throughput rate in megabytes per second (MBps)) with respect to different nodes in the network 4; a compression performance table 24 providing the compression and decompression computational performance (e.g., compression/decompression throughput rate in MBps) of nodes in the network 4; a compression ratio (CR) table 26 providing the different compression ratios realized for the different available compression algorithms 20, where the compression ratio comprises the compressed object size divided by the original object size; and a data type table 28 indicating the compression algorithms 20 to use for different data types.

Figure 3:
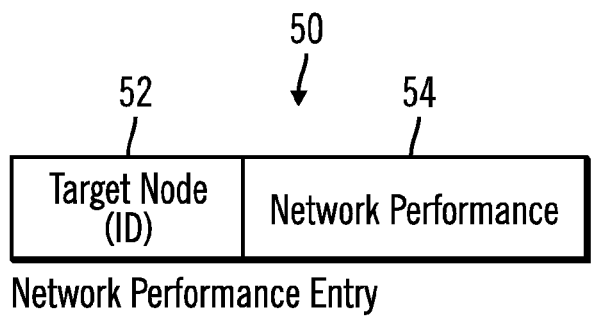
FIG. 3 illustrates an embodiment of network performance information maintained for a network node.

FIG. 3 illustrates an example of a network performance entry 50 in the network performance table 22, where there is one entry 50 for each route to a target node with which the node 2 may transmit data, such as one entry for each network adaptor in the node used to communicate with the target node. One network performance entry 50 includes a target node identifier (ID) 52 and the network performance, such as a network throughput or transmission rate 54, which may be in megabytes per second (MBps), to communicate with the identified target node 52. In the case where a node has multiple adaptors, the entry 50 would further indicate the network adaptor that provides the network throughput 54. The calibration program 18 may measure the network performance for different network nodes. The network throughput rate may be effected by the number of hops between the source and target nodes, network congestion, etc.

Figure 4:
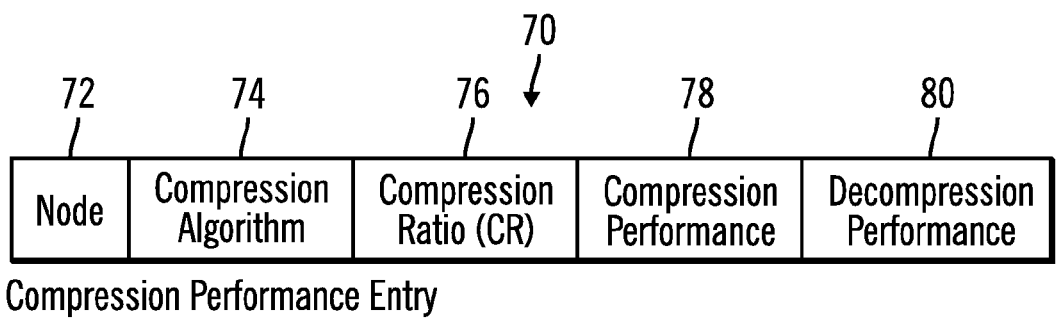
FIG. 4 illustrates an embodiment of compression performance information maintained for a network node.

FIG. 4 illustrates an example of a compression performance entry 70 maintained for each compression algorithm 20 node in the network 4 and for the current node 2 that will be transmitting the data. The entry 70 includes a node ID 72, which identifies the node using the information or one node 2a, 2b . . . 2n accessible over the network 4 to which data may be sent; a compression algorithm 74 identifying the compression algorithm to which the entry 70 information applies; a compression ratio (CR) 76 resulting from application of the compression algorithm 74; a compression performance 78 realized when compressing data using the identified compression algorithm 74; and a decompression performance 80 realized when decompressing data using the identified compression algorithm 74. The compression 78 and decompression 80 performance values in the entries 70 in the CR table 26 may be initialized to some known value and then updated when receiving dynamically determined performance data from another node's calibration program 18. The compression (decompression) performance may comprise a compression (decompression) throughput rate at which data is compressed in MBps.

Figure 5:
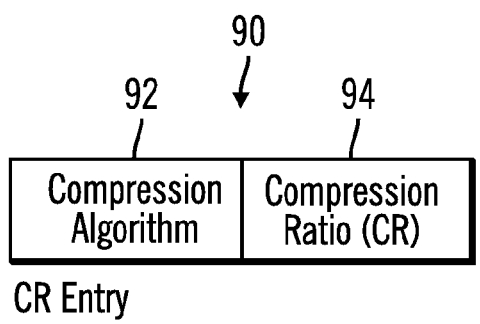
FIG. 5 illustrates an embodiment of compression ratio information maintained for a compression algorithm.

FIG. 5 illustrates an example of a CR entry 90 identifying a compression algorithm 92 and a compression ratio (CR) 94 resulting from the application of the compression algorithm 92 to compress data, wherein the CR is the compressed object size divided by the original object size. The CR table 26 has an entry 90 for each compression algorithm 20 available to the data transfer program 16.

Figure 6:
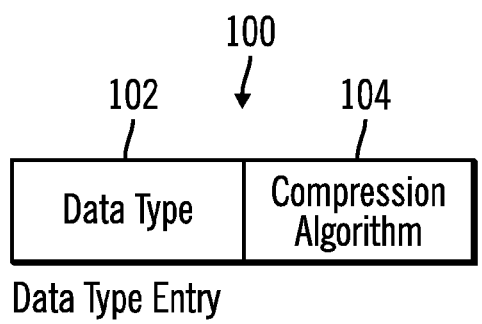
FIG. 6 illustrates an embodiment of data type information.

FIG. 6 illustrates an example of a data type entry 100 in the data type table 28, including a data type 102 and a compression algorithm 104 to use for the identified data type 102. The data type table 28 may maintain an entry for each data type maintained in the storage systems 6a, 6b that may be returned by the nodes 2a, 2b . . . 2n to a request.

Figure 7:
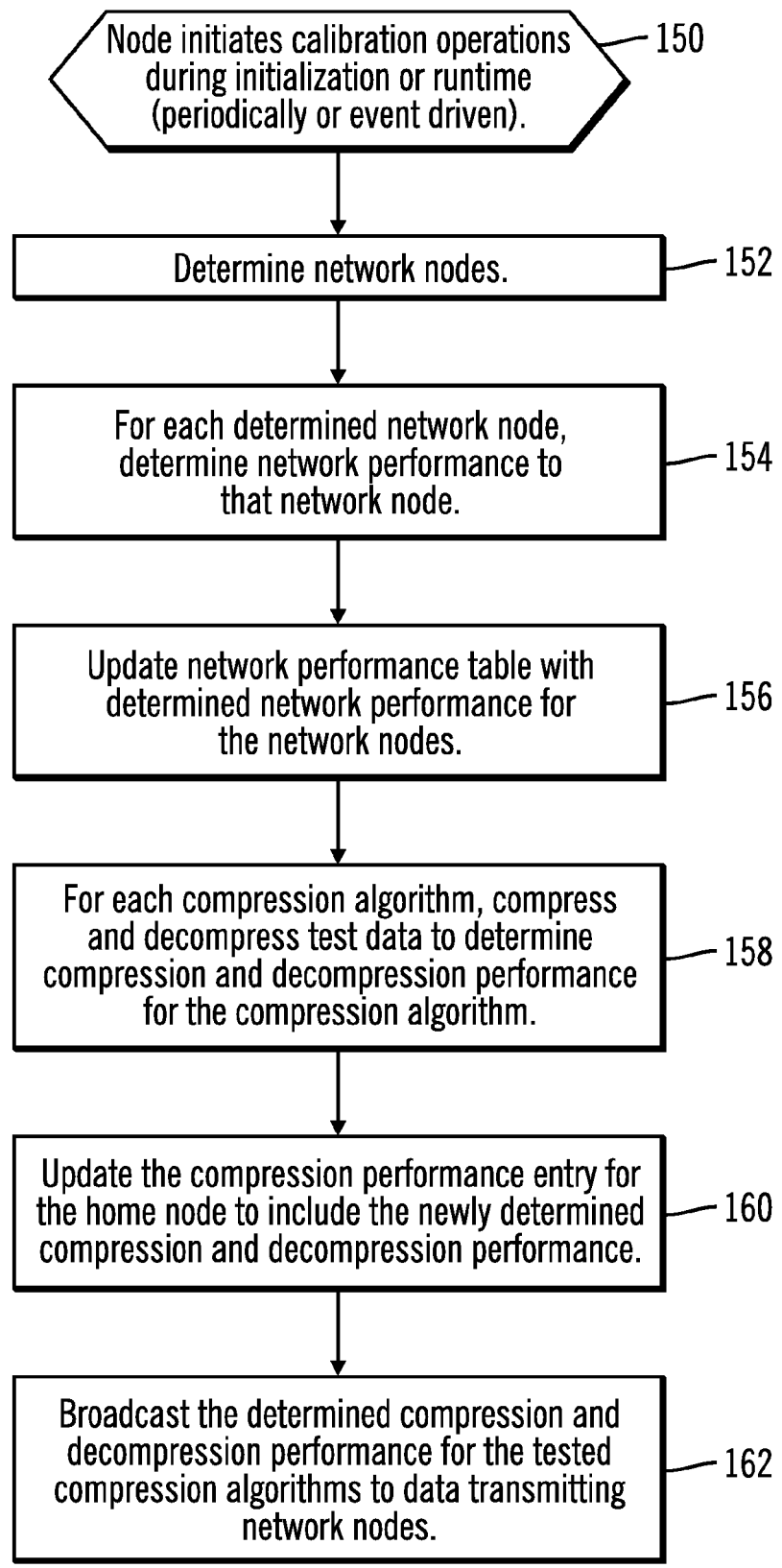
FIG. 7 illustrates an embodiment of operations to gather and distribute network and compression performance information at network node.

FIG. 7 illustrates operations performed by the calibration program 18 in one node 2, where each of the nodes 2a, 2b, 2c . . . 2n including the calibration program 18 performs these operations. At block 150, the calibration program 18 initiates calibration operations during node initialization, e.g., cold or warm start, or during node runtime. The calibration program 18 may initiate operations at block 150 periodically or in response to an event. Upon being invoked, the calibration program 18 determines (at block 152) the other nodes in the network. The identity of the other nodes in the network may have been determined as part of a discovery program during node initialization. In certain embodiments, the calibration program 18 may not determine every possible node in the network, but only a subset of the possible nodes according to a predefined criteria. For each determined network node, the calibration program 18 determines (at block 154) the network performance to that network node. The calibration program 18 may determine the network performance to a node by sending test packets over the network 4 to the target node. The network performance table 22 is updated (at block 156) with the determined network performance for the network nodes.

For each available compression algorithm 20, the calibration program 18 compresses and decompresses (at block 158) test data to determine the compression and decompression performance, respectively, for the compression algorithm 20. The compression performance entry 70 for the node being tested and the compression algorithm 78 is updated (at block 160) to include the newly determined compression and decompression performance in fields 78 and 80, respectively. The calibration program 18 broadcasts (at block 162) the determined compression and decompression performance for the tested compression algorithms 20 to network nodes. The network nodes that provide access to storage, e.g., nodes 6a, 6c, may be the nodes that save this data. In this way, by dynamically determining the computational performance of the compression algorithms during runtime, the performance data is based on the current load and situation at the node and, thus, is more accurate.

Figure 8:
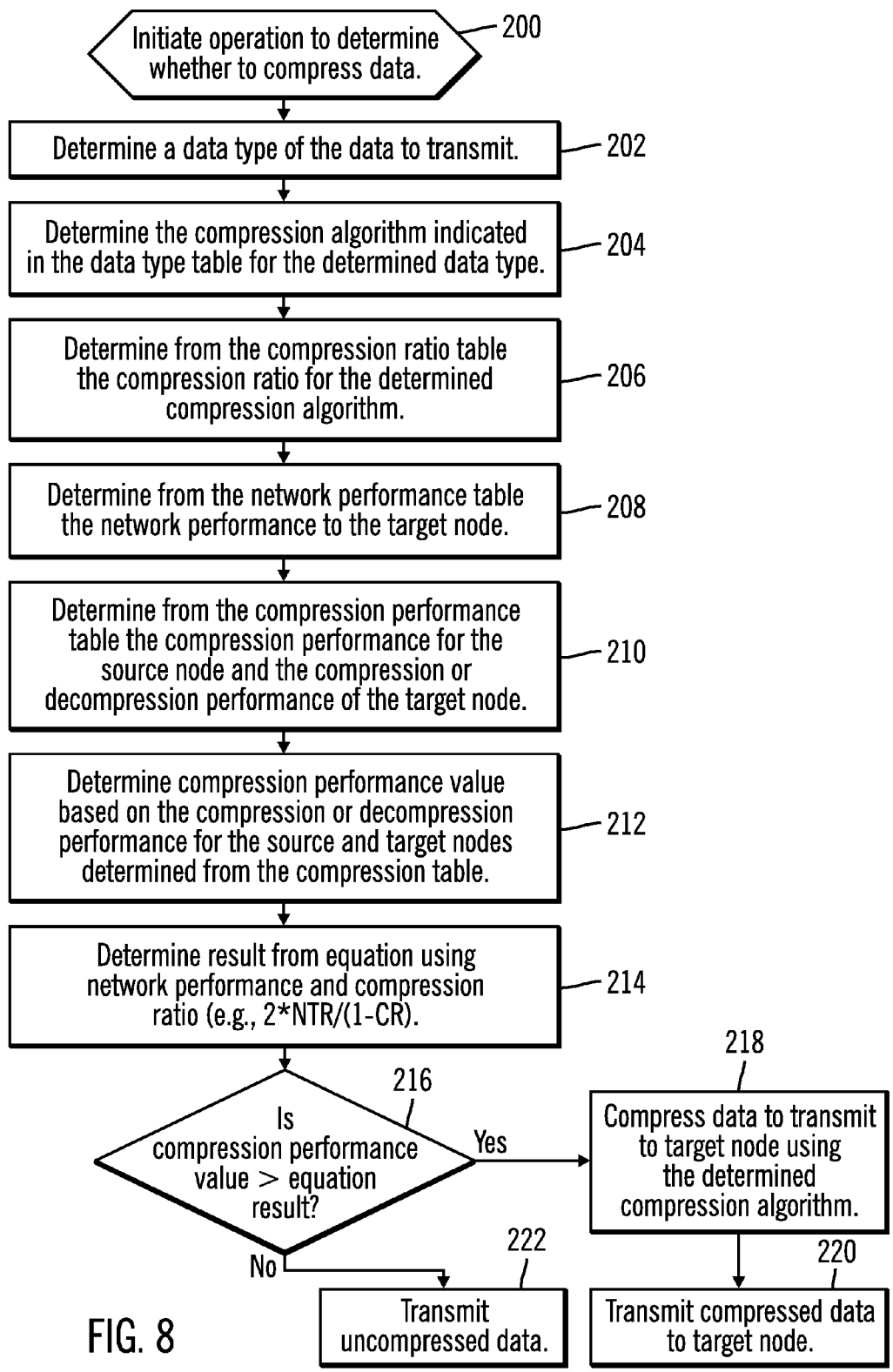
FIG. 8 illustrates an embodiment of operations to determine whether to compress data to transmit to a network node.

FIG. 8 illustrates an embodiment of operations performed by the data transfer program 16 to determine whether to compress data being transmitted to another node. Upon initiating (at block 200) an operation to determine whether to compress data to transmit to a target node 2a, 2b . . . 2n, the data transfer program 16 determines (at block 202) the data type of the data to transmit and determines (at block 204) the compression algorithm 104 (FIG. 6) indicated in the data type entry 100 for the determined data type indicated in field 102. The compression ratio 94 (FIG. 5) is determined (at block 206) from the compression table entry 90 for the determined compression algorithm indicated in field 92. The data transfer program 16 further determines (at block 208) from the network performance table 22 the network performance 54 (FIG. 3) for the target node indicated in field 52 and determines (at block 210) from the compression performance table 26 the compression performance 78 for the source node identified in node field 72 and the compression 78 or decompression 80 performance identified in the compression performance entry 70 for the target node.

The data transfer program 16 further determines (at block 212) a compression performance value based on the determined compression performance information in the compression performance table 24 for the source and target nodes. For instance the compression performance value may comprise the minimum of the determined compression performances for the source and target nodes, the average of the compression performances for the source and target nodes, or the average of the compression and decompression performance for the source and target nodes, respectively. The data transfer program 16 then determines (at block 214) a result of an equation using the determined network performance and compression ratio. In one embodiment, the magnitude of the result of the equation may be directly related to a magnitude of the network performance and inversely related to a magnitude of the compression ratio. For instance, in one embodiment, the equation may comprise $2*NTR/(1-CR)$, where NTR is the network throughput rate in MBps and CR is the compression ratio. In an alternative embodiment, the equation may be based on the network throughput rate, wherein the result of the equation increases and decreases as the network throughput rate increases or decreases, respectively.

If (at block 216) the determined compression performance value for the data subject to compression is greater than the result of the equation, then the data transfer program 16 compresses (at block 218) the data to transmit to the target node using the determined compression algorithm 20 and transmits (at block 220) the compressed data to the target node. Otherwise, if (at block 216) the compression performance value is less than the equation result, then the uncompressed data is transmitted (at block 222) to the target node.

In this way, as the network performance decreases, then compression is more likely to be used because the compression performance requirement threshold is lower, i.e., compression is more likely to be optimal in a degraded network environment. Further, as the compression ratio increases, the compression performance requirement is lower because of the increased benefits of compression due to the higher compression ratio.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article or a different number of devices/articles may be used in place of the described more than one device or article.

The functionality and/or the features of a device may be alternatively embodied by one or more other devices which are not explicitly described as having such functionality/features. Thus, other embodiments of the present invention need not include the device itself.

FIGS. 3, 4, 5, and 6 show an arrangement of information used by the data transfer program to determine when to compress data. The information shown in these figures may be maintained in different formats and arrangements than shown, and different or additional information may be provided.

The illustrated operations of FIGS. 7 and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method of operations performed at a node in a network in communication with remote nodes in the network, comprising: determining the remote nodes in the network;

determining network performance information based on a measured network transmission rate with respect to transmitting to the determined remote nodes;

determining compression performance information with respect to the node executing a compression algorithm to compress test data within the node, wherein the compression performance information is based on a current load and performance in the node when compressing the test data;

transmitting the determined compression performance information to the remote nodes over the network;

receiving from the remote nodes decompression performance information with respect to the remote nodes executing a decompression algorithm to perform decompression operations within the remote nodes, wherein the decompression performance information from the remote nodes is based on a current load and performance at the remote nodes executing the decompression algorithm;

using the determined compression performance information and the received decompression performance information to determine a computational performance value for executing the compression algorithm at the node;

determining a compression ratio (CR) resulting when the compression algorithm compresses the test data to transmit; and comparing the determined computational performance value to a ratio of the network performance information and the CR to determine whether to execute the compression algorithm at the node, wherein the ratio of the network performance information and the CR is calculated according to an equation comprising $2*NTR/(1-CR)$, wherein NTR is the measured network transmission rate.

2. The method of claim 1, wherein the network performance information is generated for each network route to the remote nodes.

3. The method of claim 1, wherein the determined compression and decompression performance information is determined for executing different compression and decompression algorithms.

4. The method of claim 1, wherein the executing of the compression algorithm and the decompression algorithm and the determining of the compression and decompression performance information are performed during initialization at the node.

5. The method of claim 1, wherein the executing of the compression algorithm, the determining of the compression performance information, the transmitting of the determined compression performance information, and the receiving of the decompression performance information from the remote nodes are performed during runtime operations at the node.

6. The method of claim 5, further comprising:

receiving from the remote nodes the decompression performance information with respect to the remote nodes executing the decompression algorithm during runtime operations at the remote nodes; and updating decompression performance information for the remote nodes with the received decompression performance information generated by the remote nodes during the runtime operations.

7. The method of claim 6, further comprising:

determining, during runtime operations at the node, network performance information with respect to transmitting to the remote nodes by transmitting packets to the remote nodes, wherein the determined network performance information and the received decompression performance information gathered during runtime operations are used to determine whether to perform compression at one of the remote nodes or the node.

8. A system in communication with a plurality of remote nodes over a network, comprising: a processor; and code executed by the processor to perform:

determining the remote nodes in the network;

determining network performance information based on a measured network transmission rate with respect to transmitting to the determined remote nodes;

determining compression performance information with respect to the processor executing a compression algorithm to compress test data, wherein the compression performance information is based on a current load and performance in the processor when compressing the test data;

transmitting the determined compression performance information to the remote nodes over the network;

receiving from the remote nodes decompression performance information with respect to the remote nodes executing a decompression algorithm to perform decompression operations within the remote nodes, wherein the decompression performance information from the remote nodes is based on a current load and performance at the remote nodes executing the decompression algorithm;

using the determined compression performance information and the received decompression performance information to determine a computational performance value for executing the compression algorithm at the node;

determining a compression ratio (CR) resulting when the compression algorithm compresses the test data to transmit; and comparing the determined computational performance value to a ratio of the network performance information and the CR to determine whether to execute the compression algorithm, wherein the ratio of the network performance information and the CR is calculated according to an equation comprising 2*NTR/(1−CR), wherein NTR is the measured network transmission rate.

9. The system of claim 8, wherein the network performance information is generated for each network route to the remote nodes.

10. The system of claim 8, wherein the determined compression and decompression performance information is determined for executing different compression and decompression algorithms.

11. The system of claim 8, wherein the executing of the compression algorithm and the decompression algorithm and the determining of the compression and decompression performance information are performed during initialization.

12. The system of claim 8, wherein the executing of the compression algorithm, the determining of the compression performance information, the transmitting of the determined compression performance operation, and the receiving of the decompression performance information from the remote nodes are performed during runtime operations.

13. The system of claim 12, wherein the code is further enabled to cause:

receiving from the remote nodes decompression performance information with respect to the remote nodes executing the decompression algorithm during runtime operations at the remote nodes; and updating decompression performance information for the remote nodes with the received decompression performance information generated by the remote nodes during the runtime operations.

14. The system of claim 13, wherein the code is further enabled to cause:

determining, during runtime operations, network performance information with respect to transmitting to the remote nodes by transmitting packets to the remote nodes, wherein the determined network performance information and the received decompression performance information gathered during runtime operations are used to determine whether to perform compression at the processor.

15. An article of manufacture comprising a computer readable hardware device having code executed in a node to communicate with remote nodes over a network and to perform operations, the operations comprising: determining the remote nodes in the network;

determining network performance information based on a measured network transmission rate with respect to transmitting to the determined remote nodes;

determining compression performance information with respect to executing a compression algorithm to compress test data within the node, wherein the compression performance information is based on a current load and performance in the node when compressing the test data;

transmitting the determined compression performance information to the remote nodes over the network;

receiving from the remote nodes decompression performance information with respect to the remote nodes executing a decompression algorithm to perform decompression operations within the remote nodes, wherein the decompression performance information from the remote nodes is based on a current load and performance at the remote nodes executing the decompression algorithm;

using the determined compression performance information and the received decompression performance information to determine a computational performance value for executing the compression algorithm at the node;

determining a compression ratio (CR) resulting when the compression algorithm compresses the test data to transmit; and comparing the determined computational performance value to a ratio of the network performance information and the CR to determine whether to execute the compression algorithm at the node, wherein the ratio of the network performance information and the CR is calculated according to an equation comprising 2*NTR/(1−CR), wherein NTR is the measured network transmission rate.

16. The article of manufacture of claim 15, wherein the network performance information is generated for each network route to the remote nodes.

17. The article of manufacture of claim 15, wherein the compression and decompression performance information is determined for executing different compression and decompression algorithms.

18. The article of manufacture of claim 15, wherein the executing of the compression algorithm and the decompression algorithm and the determining of the compression and decompression performance information are performed during initialization at the node.

19. The article of manufacture of claim 15, wherein the executing of the compression algorithm, the determining of the compression performance information, the transmitting of the determined compression performance operation, and the receiving of the decompression performance information from the remote nodes are performed during runtime operations at the node.

20. The article of manufacture of claim 19, wherein the code is further executed to perform:
    receiving from the remote nodes the decompression performance information with respect to the remote nodes executing the decompression algorithm during runtime operations at the remote nodes; and
    updating decompression performance information for the remote nodes with the received decompression performance information generated by the remote nodes during the runtime operations.

21. The article of manufacture of claim 20, wherein the code is further executed to perform:
    determining, during runtime operations at the node, network performance information with respect to transmitting to the remote nodes by transmitting packets to the remote nodes, wherein the determined network performance information and the received decompression performance information gathered during runtime operations are used to determine whether to execute the compression algorithm at the node.

22. The method of claim 1, further comprising:
    maintaining, for each of the remote nodes, network performance information to transmit packets to the remote node; and
    maintaining, for the node and each of the remote nodes, compression and decompression performance information for the node and the remote nodes to execute the compression algorithm and the decompression algorithm to perform compression and decompression in the node and the remote nodes, respectively.

23. The system of claim 8, wherein the code is further executed to perform:
    maintaining, for each of the remote nodes, network performance information to transmit packets to the remote node; and
    maintaining, for the node and each of the remote nodes, compression and decompression performance information for the node and the remote nodes to execute the compression algorithm and the decompression algorithm to perform compression and decompression operations in the node and the remote nodes, respectively.

24. The article of manufacture of claim 15, wherein the operations further comprise:
    maintaining, for each of the remote nodes, network performance information to transmit packets to the remote node; and
    maintaining, for the node and each of the remote nodes, compression and decompression performance information for the node and the remote nodes to execute the compression algorithm and the decompression algorithm to perform compression and decompression in the node and the remote nodes, respectively.

* * * * *